(12) United States Patent
Eastep et al.

(10) Patent No.: US 10,466,754 B2
(45) Date of Patent: Nov. 5, 2019

(54) DYNAMIC HIERARCHICAL PERFORMANCE BALANCING OF COMPUTATIONAL RESOURCES

(71) Applicant: Intel Corporation, Santa Clara, CA (US)

(72) Inventors: Jonathan M. Eastep, Portland, OR (US); Ilya Sharapov, San Jose, CA (US); Richard J. Greco, West Linn, OR (US); Steve S. Sylvester, Hillsboro, OR (US); David N. Lombard, Rossmoor, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/583,237

(22) Filed: Dec. 26, 2014

(65) Prior Publication Data
US 2016/0187944 A1    Jun. 30, 2016

(51) Int. Cl.
| | | |
|---|---|---|
| *G06F 1/26* | (2006.01) | |
| *G06F 1/3203* | (2019.01) | |
| *G06F 1/324* | (2019.01) | |
| *G06F 9/50* | (2006.01) | |

(52) U.S. Cl.
CPC ............ *G06F 1/26* (2013.01); *G06F 1/3203* (2013.01); *G06F 1/324* (2013.01); *G06F 9/5061* (2013.01); *G06F 9/5094* (2013.01); *Y02D 10/126* (2018.01); *Y02D 10/22* (2018.01)

(58) Field of Classification Search
None
See application file for complete search history.

(56) References Cited

U.S. PATENT DOCUMENTS

| | | | |
|---|---|---|---|
| 7,102,556 B2* | 9/2006 | White | G01R 21/133 341/118 |
| 7,602,874 B2 | 10/2009 | Hilgendorf et al. | |
| 2005/0160133 A1 | 7/2005 | Greenlee et al. | |
| 2009/0083390 A1 | 3/2009 | Abu-Ghazaleh et al. | |
| 2009/0138737 A1* | 5/2009 | Kim | G06F 1/324 713/322 |
| 2009/0144566 A1 | 6/2009 | Bletsch et al. | |

(Continued)

FOREIGN PATENT DOCUMENTS

| | | | | |
|---|---|---|---|---|
| TW | I406121 A | 8/2013 | | |
| WO | WO 2015016947 A1 * | 2/2015 | ............ | H02J 13/001 |

OTHER PUBLICATIONS

Random House Dictionary, "nonstatistic statistic", Jun. 26, 2013, memidex.com.*

(Continued)

*Primary Examiner* — Wynuel S Aquino
(74) *Attorney, Agent, or Firm* — Jordan IP Law, LLC

(57) ABSTRACT

Systems and methods may provide a set of networked computational resources such as nodes that may be arranged in a hierarchy. A hierarchy of performance balancers receives performance samples from the computational resources beneath them and uses the performance samples to conduct a statistical analysis of variations in their performance. In one embodiment, the performance balancers steer power from faster resources to slower resources in order to enhance their performance, including in parallel processing.

23 Claims, 7 Drawing Sheets

(56) References Cited

U.S. PATENT DOCUMENTS

| | | | |
|---|---|---|---|
| 2010/0306781 A1* | 12/2010 | Loboz | G06F 9/5083 |
| | | | 718/105 |
| 2011/0289507 A1 | 11/2011 | Khan et al. | |
| 2012/0324248 A1* | 12/2012 | Schluessler | G06F 1/3253 |
| | | | 713/300 |
| 2013/0024710 A1 | 1/2013 | Jackson | |
| 2013/0097443 A1 | 4/2013 | Li et al. | |
| 2013/0103929 A1 | 4/2013 | Ballew et al. | |
| 2013/0346969 A1 | 12/2013 | Shanmuganathan et al. | |
| 2015/0121105 A1* | 4/2015 | Ahn | G06F 1/3293 |
| | | | 713/322 |
| 2015/0198997 A1* | 7/2015 | Ting | G06F 1/3215 |
| | | | 713/320 |
| 2016/0179167 A1* | 6/2016 | Yeo | H02J 13/001 |
| | | | 713/340 |

OTHER PUBLICATIONS

International Search Report and Written Opinion for International Application No. PCT/US2015/000402, dated Apr. 25, 2016, 15 pages.

Extended European Search Report for European Patent Application No. 15873816.1, dated Aug. 22, 2018, 11 pages.

\* cited by examiner

DYNAMIC HIERARCHICAL PERFORMANCE BALANCING OF COMPUTATIONAL RESOURCES

STATEMENT OF GOVERNMENT INTEREST

This invention was made with Government support under contract number H98230-11-3-0011 awarded by the Department of Defense. The Government has certain rights in this invention.

TECHNICAL FIELD

Embodiments generally relate to balancing computational resources. More particularly, embodiments relate to dynamically balancing computational resources.

BACKGROUND

Computer architectures have grown in complexity from architectures using a single processor having single cores to architectures using aggregations of multi-core processors. In addition, High Performance Computing (HPC) may utilize processor groups to handle work according to various computational topologies and architectures. For example, an HPC application may be divided into various tasks that may be subdivided into groups of related subtasks (e.g., threads), which may be run in parallel on a computational resource. Related threads may be processed in parallel with one another as "parallel threads," and the completion of a given task may entail the completion of all of the related threads that form the task.

Computational efficiency may be enhanced by allowing parallel threads to be completed at the same time, reaching a defined point nearly simultaneously. Individual threads may, however, arrive at the defined point at different times in parallel applications. The variation may be due to a variability of computational work among various kinds of tasks, differences that may arise in computational conditions (e.g., variation in timing due to delays in accessing data from memory and/or from remote resources), and so on. Thus, there may be a load imbalance among the computational resources employed, with some threads waiting for other threads to complete. The load imbalance may lead to inefficiencies in performance and power utilization, since computational resources may be idle while waiting for remaining tasks to be completed.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Figure 1:
FIG. 1A is an example of a hierarchy of computational resources at a hardware level.
FIG. 1B is an example of a hierarchy of work at a software level.

Computational resources may be considered, and/or grouped together, in a variety of ways, according to a number of different taxonomies, and so on. Turning now to FIG. 1A, an example of a hierarchy of hardware computational resources is shown, in which the most basic element is a core. Multiple cores may be grouped together on a single multi-core processor, and a plurality of multi-core processors (e.g., 2, 4, 8 or more) may be grouped together to form a node. Nodes may be grouped together to form a cabinet (e.g., a rack), cabinets may be grouped together to form a row, rows may be grouped together to form a cluster, and clusters may be grouped together to form a grid.

There are other taxonomies and hierarchies of computational resources. For example, in some taxonomies, cabinets may be grouped together to form clusters, and the term "row" for one of the levels in the hierarchy may be dispensed with. A particular number of a given resource that may be in levels of the hierarchy may vary. For example, groups of upwards of 1,000 to 10,000 and more nodes may be connected together in a single cluster. In HPC, cabinets and nodes that form an individual cluster may be co-located in a common facility, and may be serviced by a local power grid. Co-location may be valuable in HPC, in which the nodes may be interconnected by a relatively low latency, high bandwidth fabric, since communicating over greater distances may add latency. Moreover, an HPC may further be homogenous. For example, nodes may be built to a common hardware standard.

In parallel processing, multiple computational resources may be used in a solution of a problem. Although portions of the following discussion may include nodes for illustration, embodiments presented herein may utilize computational resources at a variety of levels, such as cores, processors, nodes, cabinets, rows, clusters, grids, etc., or any combination thereof.

Additionally, HPC may present a hierarchy in terms of units of work that the hardware performs, and an example of the hierarchy is shown in FIG. 1B. Software that is run on an HPC system may be referred to as an application, and an instance of its execution may be referred to as a job (although in some contexts, the terms "application" and "job" may be used synonymously with one another). A job may include a number of tasks. In parallel computing, a given task may be broken down into a related group of subtasks, which may be referred to as threads. Threads may be run concurrently in parallel with one another, with each thread running on a separate computer resource such as, e.g., a core.

In parallel processing, code that is to be processed in a parallel fashion may break into individual instances (copies) of itself. Instances may refer to a "rank" in one form of parallel processing that uses a programming model based on a communication library and a runtime called Message Passing Interface (MPI).

A thread may execute work on a core, and a thread may be referred to as code that runs on a core and that causes work assigned to the thread to execute on the core. A thread may represent a series of work assigned to the thread, or simply "work." A particular set of work undertaken by a parallel group of threads within a task may be completed when all of the threads in the parallel group of threads have reached a common milestone in terms of the work that the group has completed, which may or may not correspond to the completion of the threads.

High Performance Computing (HPC) systems may include a relatively large number of nodes connected by a high speed network fabric for distributed computing. Generally, a job may be divided into tasks that run concurrently across numerous nodes (e.g., nodes may number in the tens of thousands) in the HPC systems. The nodes may be distributed in cabinets, rows, clusters, and so forth. There may be one or multiple tasks mapped to each node, as a node may be able to execute a plurality of tasks concurrently. A given task, however, may generally run on a single node. In addition, a given task may be broken down into a number of threads, one thread may run on a single core, and a core may support a single thread at a time.

A problem in parallel processing is that the threads must be in sync with one another, lest some threads race ahead of others. One approach to address a premature processing of work in parallel processing is to allow related threads (forming a task) to each reach a common milestone before any one of the related threads may continue on its respective core. A milestone may be provided as barrier for individual parallel threads to reach, so that at a point represented by the barrier, the parallel threads have each completed a certain defined amount of work allotted to them. Thus, at the point represented by the barrier, the threads may be in a state of synchronicity with one another.

Barriers may be scheduled in time (e.g., occurring with a particular frequency) and/or they may be event-based, occurring when the threads complete some amount or type of work that is computed and assigned at initialization and/or when a previous barrier was reached. The provision of barriers may refer to barrier synchronization, and the barrier may refer to a synchronization barrier, a global synchronization barrier, or simply a "barrier."

Parallel processing may utilize synchronization barriers as global barriers, at which all related threads pause until each of the threads processing (e.g., each on its respective core) have completed the work that has been assigned to each of the threads. Again, and depending on the architecture, global barriers may be time-based and/or may be event-based. Ideally, all threads would arrive at a given barrier at the same time.

In practice, however, threads (and, in their aggregate, tasks) may not complete in the same amount of time. If a core or node completes the work between synchronizations more slowly than other cores or nodes (or other computational resource where synchronicity may be of importance), progress of an entire application may halt until the slowest task completes the work. Thus, the application may lose potential performance and power may be wasted in the cores and/or nodes that are waiting. This problem may be referred to as application jitter, performance variation, load imbalance, and so on.

Load imbalance may occur even when the computational resources employed appear to be identical (e.g., when cores have been designed to a common specification), and even when the problem has been broken down in what appears to be equal sized portions (e.g., in a large sort, wherein each node may be given a fixed, equal fraction of the data to sort). There may be a number of causes for such variations. Commonly, the causes may be characterized as "static" or they may be characterized as being "dynamic." In the static case, the cause may be more or less invariant over time, whereas some variability in an operating characteristic arises over time in the dynamic case.

One source of static variability may include as-manufactured variability of hardware. Even though every processor may nominally be identical to every other processor, manufacturing processes may admit some variation in processor qualities, such as processor frequency, speed, and so on.

Examples of dynamic sources of variability include Input/Output (I/O) interrupts from the Operating System (OS), which may slow down a processor. Wake up times, for example, due to I/O calls, may vary over time as well, as may a frequency and/or a moment at which a node may be interrupted by an OS. Memory accesses that are made by tasks executing on processors may require varying amounts of time to service, depending on the task. Additional sources of variability may include jitter effects, for example, from the OS interrupting threads on one core and/or processor differently than other threads to perform OS duties such as, e.g., updating a clock, running system software to support an application, and so on. Another dynamic source of variability may be from recoverable hardware errors occurring differently from one node to another node.

Still other sources of variability may from the nature of a job being processed. For example, tasks may not divide evenly among resources, either at the software level, or in terms of allocation of hardware (e.g. processors, nodes, etc.) to the job and/or tasks.

Load imbalance may present a substantial source of performance loss and/or wasted power as HPC systems continue to increase in scale and complexity. Manufacturing variability is itself problematic. Some processors may not run intensive workloads at maximum processor frequency without exceeding thermal design and/or power limits. Moreover, two processors of an identical model and stepping may require different power levels to achieve the same frequency. By some industry estimates, the variation in processor performance for some given power budgets may exceed 20%.

Somewhat analogously to tasks and threads, a job may be broken down into tasks, and it may be desirable that related tasks similarly be made to pause at common milestones until all of the related tasks have caught up. The milestones may again be referred to as a synchronization barrier, a global synchronization barrier, or simply a "barrier," and they provide a point at which work allotted to related tasks (e.g., "parallel" tasks) catches up so that no task in the group may continue processing in its node until all tasks have reached the barrier. At the point in time or work represented by the barrier, the parallel tasks have each been completed to some desired degree and may be in a state of synchronicity with one another.

As with threads, it may be desirable that tasks arrive at a given barrier at the same time. Commonly, however, the tasks may not arrive at the same time, as underlying threads may vary (discussed above). The resulting waiting times may represent waste, in both processor time and power usage.

At the atomic level, waiting times may be relatively reduced by shifting performance balance among cores. According to one embodiment herein, data concerning the performance of individual cores (and/or processors) may be collected via progress meters, which may be implemented in hardware (e.g., via power or energy measuring circuitry), in software, and so on, or combinations thereof. One example software implementation may include annotations in code run on the cores that track an execution of a thread on its respective core as the thread runs. The progress meters compute an amount of work that completion of a thread entails, and then, at periodic intervals thereafter, compute an amount of work remaining until the next global synchronization barrier is reached. Information on the progress of threads may be subsequently used to control the speed of the nodes, the allocation of computer resources among the threads, and so on.

The information presented by progress meters may be used to shift the performance balance of the threads in question. In one embodiment, the frequency of the cores (or their respective processors, where core-specific control may not be available) on which slower threads are running may be increased. This may be accomplished directly at the core level, or indirectly by adjusting the power provided to the core. Over a range, the operating frequency of a core may vary with an amount of power provided to the core. Other ways of varying core performance may include varying the memory assets made available to a given core, or modifying shared communications assets among the cores. Thus, performance of relatively poor performing cores may be enhanced, and in some instances, performance of relatively highly performing cores may be simultaneously reduced.

Embodiments presented herein may be used at the granular level of a core, such in the aforementioned hierarchy of computational resources (FIG. 1A), discussed above, to balance power among cores. Power monitors and controls at the core granularity may be employed for this purpose. Alternatively, other embodiments may steer power at the processor granularity using other power monitors and controls, which may take the form of circuitry or software.

Embodiments provided herein may provide a scalable dynamic method of mitigating load imbalance in a job by steering power between hierarchical domains. Embodiments providing hierarchical dynamic power balancing may utilize a hierarchy of performance balancers. In one embodiment, a method is provided that may decompose the problem of load balancing for the job as a whole in a "top down" manner. First, a power budget may be presented to a group of cabinets to be apportioned among the cabinets by a method discussed further below. Then power may be balanced among the nodes within each cabinet in response to a power budget provided at the cabinet level. Next, power balancing may occur among tasks mapped to each node in response to power budgets issued at the node level. Then, power balancing may occur among the cores running each task.

At each level of granularity, performance may be compared dynamically, and power may be steered from computational elements that are ahead to computational elements that are behind, to maximize application performance. In general, power budgets and/or commands for power allocation may flow from the top-down, whereas telemetry on computational resource performance and power usage may flow from the bottom-up.

Further embodiments disclosed herein may provide performance balancing at various granularities that need not be coterminous with physical boundaries of a node, a cabinet, a cluster, and so on. For example, a cabinet may be partitioned into convenient groups of nodes within the cabinet, and performance may be balanced among the groups.

Embodiments may further utilize application phases for occasioning balancing commands, and may steer power on the basis of individual phases. A phase may be referenced as a recurring segment of code execution with a distinct compute, memory, and communication resource activity profile. A current phase may be determined in a number of ways, such as by obtaining information from application code through mark-up or annotating the application with code, and/or by inferring a phase passively through dynamic analysis of the activity in different computational resources, for example, via the use of event counters in the hardware.

Figure 2:
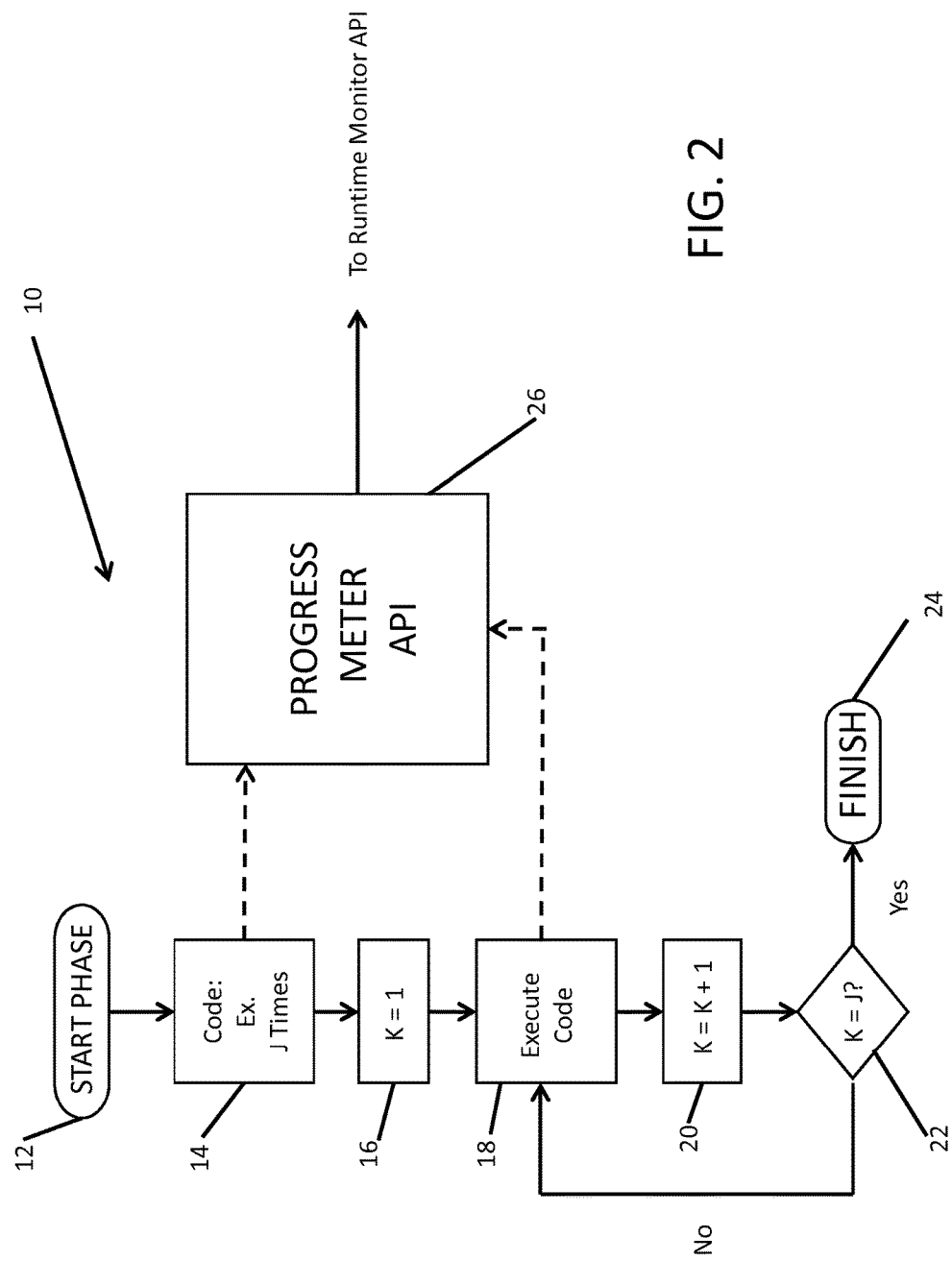
FIG. 2 is a flowchart of an example of a phase-based method of annotating code to provide data of use in performance balancing according to an embodiment.

FIG. 2 shows a flowchart of an example of a phase-based method 10 of annotating application code to provide data of use in performance balancing. The method 10 may readily be adapted for use in event-based applications as well. The method 10 may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), CMOS or transistor-transistor logic (TTL) technology, or any combination thereof. For example, computer program code to carry out operations shown in the method 10 may be written in any combination of one or more programming languages, including an object oriented programming language such as C++ or the like and conventional procedural programming languages, such as the "C" programming language or similar programming languages. Moreover, the method 10 may be implemented using any of the herein mentioned circuit technologies.

An application task begins to execute at illustrated processing block 12. At processing block 14, the task may be passed a parameter indicating that it is to be executed J times. A variable K may be employed as a counter for tracking the number of passes through the code, and initialized to an integer 1 at illustrated processing block 16. The code may be executed at illustrated processing block 18, and the variable K may be incremented at illustrated processing block 20. Block 22 determines if K=J. If K does not equal J, then control loops back to the processing block 18. If block 62 determines that K=J, then the code finish executing at illustrated processing block 24.

A progress meter 26 may be provided (e.g., in the form of an API) that may be inserted into or in parallel with existing code. The progress meter 26 may be passed the value of J and it may track the number of loops that have been made and/or are yet to be made through the code. Access to the code to be executed, along with both the number of iterations through the code that have been made (K) and the number of iterations that are to be made (J) may provide a measure of progress made at a level of each iteration through the loop. For example, if J=10, then when K=1, 10% of work on a thread has been completed. In another example, when K=8, 80% of work has been completed. Alternatively, these numbers may be expressed as percentage of work that remains to be completed (e.g., in the first example, 90% of the work remains to be done, and in the second example, 20% of the work remains to be done.) The fraction of work completed or to be completed with respect to a given computational asset (such as a core or node) may be termed a "work fraction." The progress meter 26 may pass the work fraction to a run-time monitor API, discussed below, to affect the processing of the threads.

Figure 3:
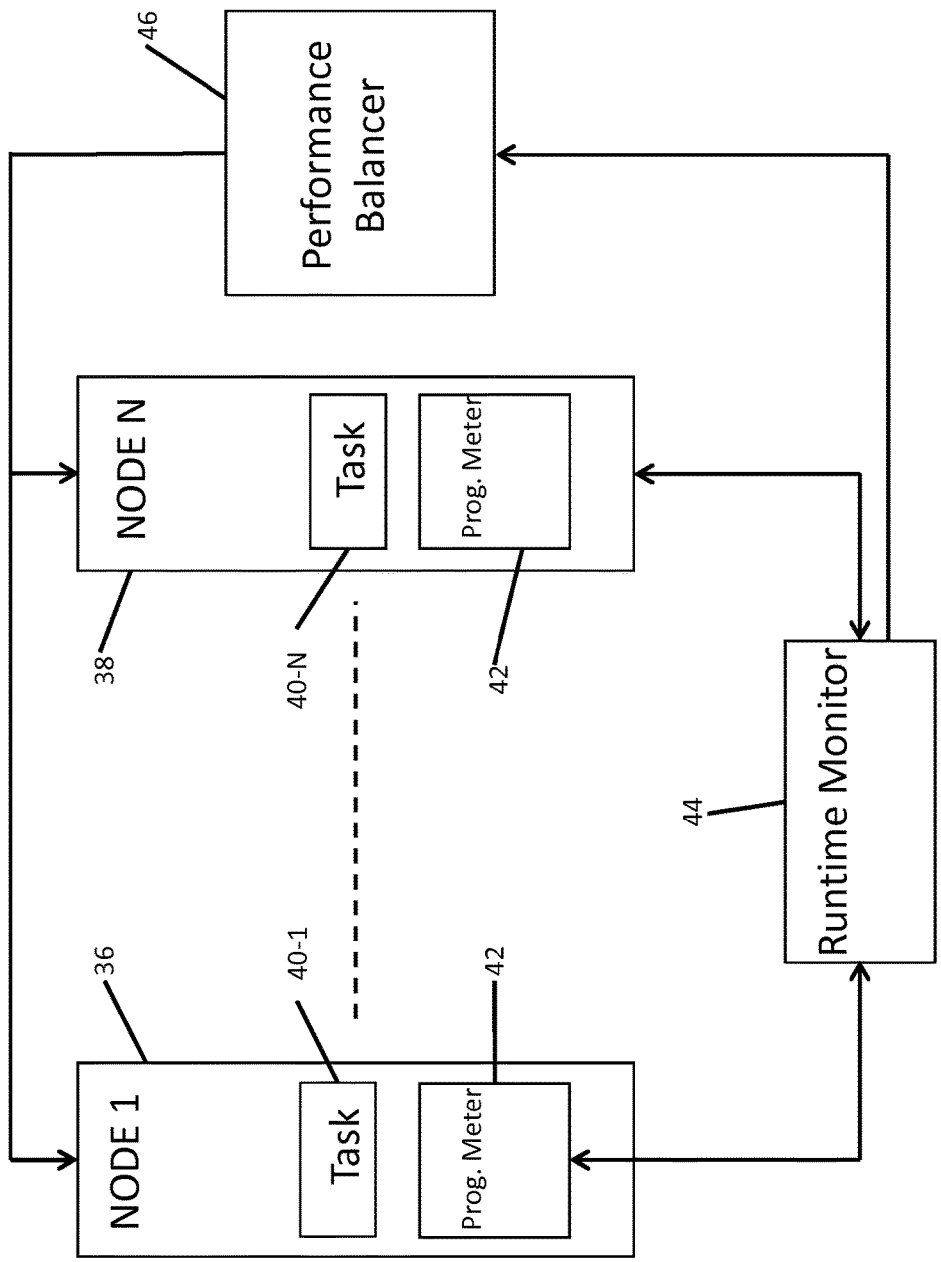
FIG. 3 is a block diagram of an example of a hardware arrangement that uses progress meters according to an embodiment.

Turning now to FIG. 3, a block diagram of an example of an embodiment that utilizes progress meters is shown. A group of nodes may be provided including a first node at 36 and an Nth node at 38. Each of the nodes 36 . . . 38 execute all of a single task 40-1 . . . 40-N. All of a given task may be run in a given node, although in other embodiments tasks may be shared among nodes and each of tasks 40-1 . . . 40N may be an instance of parallel code that may be identical from node-to-node. Although the illustrated embodiment depicts a single task running in each node, in other embodiments more than one task may run in a given node. Each of the nodes 36 . . . 38 may be provided with a progress meter 42 that reports to a runtime monitor 44 (e.g., may be an API) at various times. The reporting times may be determined within the task 40, the progress meter 42, or the runtime monitor 44. The reporting times may be event-based, such as when a predetermined number of loop iterations has occurred, or they may be time based or phase based.

At a first global synchronization point, the progress meters 42 of each of the nodes 36 . . . 38 report the total amount and/or percentage of work that is to be done for each thread within the node from start to completion. Then, at subsequent intervals as noted above, the progress meters 42 of each of the nodes 36 . . . 38 report the work fraction on a thread-by-thread basis for each of the nodes 36 . . . 38. The overall-performance of a given node may be quantified as a statistical measure of the performance of the individual threads running on their respective cores. For example, measures of node performance may be based on an average, median, minimum, maximum, mean deviation, and/or skew of the performance of the threads executing on cores within the node.

In one embodiment, the progress meters 42 may aggregate the performance data of each of the related threads making up a task running on a node and provide a statistical measure of thread performance to the runtime monitor 44. In another embodiment, the runtime monitor 44 may aggregate the performance data for each of the related cores in a given node and determine a performance measure for each node.

According to one embodiment, the performance of each domain (e.g., node, cluster, etc.) may be tied to the performance of the most poorly performing computational resource within the domain. Advantageously, taking a minimum performance (e.g., at the core level) as a measure of performance of a next-higher level computational asset to which it belongs (e.g., the node) may permit percentage-based representations of progress that makes it possible to compare progress of threads even though they may belong to different tasks.

Thus, in the illustrated embodiment, a minimum-function ("min-function") approach may be used to take the performance of the poorest performing thread in a given node as a measure of the performance of the entire node to which it belongs. In this embodiment, each node may be seen as no better performing than its weakest link (e.g., its weakest performing thread/core).

The runtime monitor 44 forwards performance information to a performance balancer 46, which may use the information provided by the progress meters 42 to balance or re-balance the performance of the individual nodes 36 . . . 38. In general, the performance of the more poorly performing node or nodes may be enhanced, possibly at the expense of better performing nodes.

Node performance may be adjusted in a number of ways. Where the cores permit direct control of their frequencies, all of the cores in a given thread may be set to a common frequency, and the common frequency may be boosted in the case of relatively poorly performing nodes and/or reduced for relatively better performing nodes. Reducing the performance of the relatively better performing nodes may save power consumption. Another approach may be to provide the cores within a node with a power budget that a logic parcels out among the cores, to enhance node performance. The logic may take the form of circuitry or software or both, and may form part of the power balancer.

Additionally, the slowest, most poorly performing core in the node may be identified, and the frequencies of such cores may be adjusted upwards where such direct control is available. In addition, where direct control over core performance is not available, the frequency of a processor of which it is part may be adjusted. Otherwise, when direct control over core (or processor) frequency is not available, core performance may still be adjusted by controlling the amount of power provided to the cores (or processors). Relatively poorly performing cores may be given more power to boost their frequency, and relatively better performing cores may be given less power. Simply put, power may be "steered" from relatively faster cores to relatively slower cores. While steering may reduce the performance of the better performing cores at the expense of the better performing cores, it may still have the effect of boosting node performance overall, especially where such performance is taken to be the minimum performance of any core in the node.

Additional embodiments to control power may use hardware implementations of power sensing circuits, instead of software, to detect and/or balance levels of power consumption in computational resources. In other embodiments, a mix of hardware and software elements may be used. For example, software may be used to provide control while hardware may be used to monitor power usage (e.g., through power sensing circuits or low-level modeling). In other embodiments software may perform both power modeling and monitor usage (e.g., with monitoring based on modeling). Moreover, hardware may be used both for monitoring power use and balancing power among computational resources such as cores, nodes, clusters, etc. Hybrids are also possible where monitoring is performed in part by software models and in part by hardware. Additionally, in other embodiments, hardware may be used to provide control alongside software used to provide monitoring.

While embodiments of performance balancers have been described for performance balancing among nodes for illustration purposes, methods disclosed herein may be used at other granularities of computational resource. For example, in considering the performance of a plurality of cabinets, the performance of the poorest performing node within a given cabinet may be taken as a measure of the performance of the cabinet as a whole. In this case, the performance balancer may be used to steer power from relatively better performing nodes to relatively poorly performing nodes.

Figure 4:
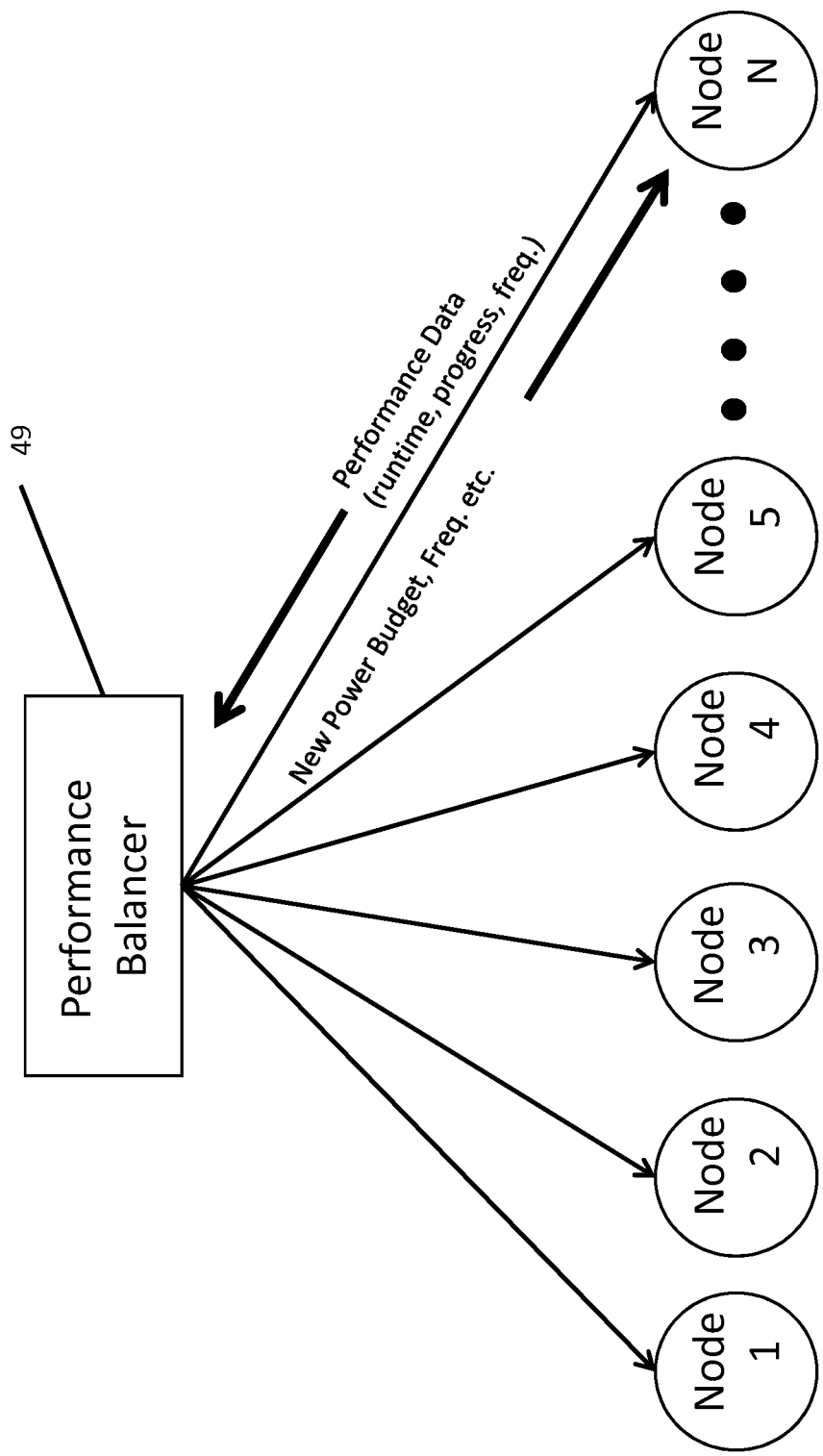
FIG. 4 is a block diagram of an arrangement of hardware elements to balance node performance according to an embodiment.

FIG. 4 shows a block diagram of an example of a hardware elements to balance node performance according to an embodiment. A logical view of an embodiment of a performance balancer 49 linked to N computational resources, here indicated as nodes 1, 2, 3, 4, 5, . . . N, is shown. The nodes 1, 2, 3, 4, 5, . . . N may repeatedly send performance data indicative of node performance to the performance balancer 49, such as through the use of progress meters (e.g., FIGS. 2 and 3), discussed above. In one embodiment, node performance may be determined by the performance of the most poorly performing core in a node as it executes its thread. In response to receiving the performance data, the performance balancer 49 may alter node performance in a number of ways.

For example, the performance balancer 49 may directly alter a common frequency of operation for a group of cores within a node, up to and including altering the frequency of operation for all of the cores within a node. In another embodiment, the performance balancer 49 may boost the performance of only the worst performing core or cores in a node, as by directly boosting their frequencies or by providing the worst performing cores with additional power. Moreover, the performance balancer 49 may provide each of the nodes 1, 2, 3, 4, 5, . . . N with a new mean frequency that has been selected to come as close as practical to corresponding to a particular power budget. The mean frequencies may be computed with models that estimate power as a function of core frequency, or they may be selected via heuristics based on the experimental tuning of the cores.

The performance balancer 49 may be stepped in a number of ways. In one embodiment, the performance balancer 49 may be stepped to respond to performance data from below by issuing balancing commands whenever updated performance data from the progress meters arrive, which may be at regular intervals in time. In another embodiment, the performance balancer 49 may be stepped on a per phase basis so that the progress balancer 49 responds with balancing commands based on executions of phase, or at some fixed time interval within each phase. The performance balancer 49 may also step on the basis of an event within the thread (such as completion of a loop).

It is noted that the approach presented in FIG. 4, while depicting performance balancing at the node level, may be adapted for use at other hierarchical levels. For example, instead of balancing nodes, the approach may be adapted to balance cabinets, clusters, and so on.

Figure 5:
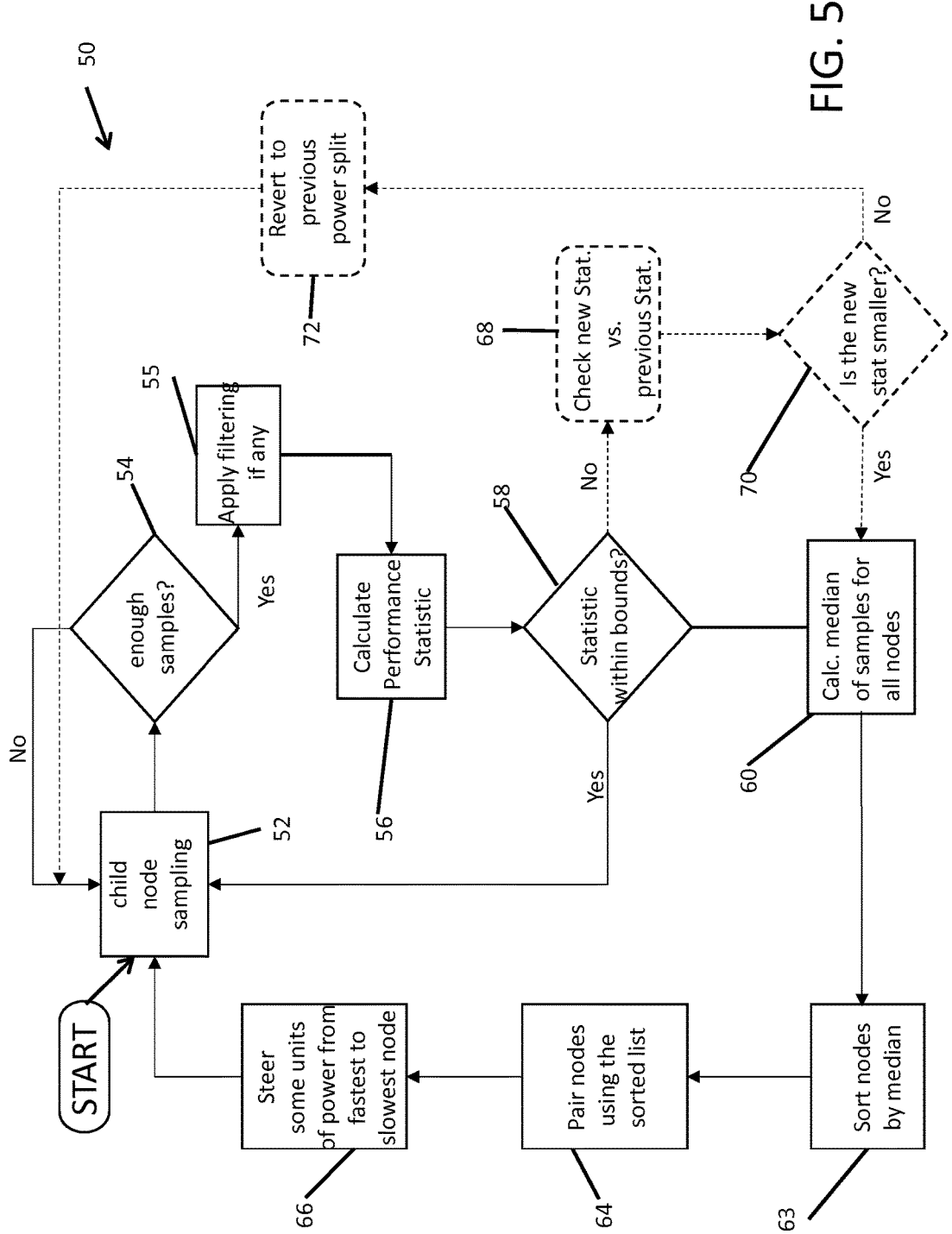
FIG. 5 is a flowchart of an example of a method of steering power according to an embodiment.

FIG. 5 shows a flowchart of an example of a method 50 in which a performance balancer may utilize performance samples to control the performance of nodes by adjusting the amount and balance of power provided to the nodes according to an embodiment. The method 50 may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), CMOS or transistor-transistor logic (TTL) technology, or any combination thereof. For example, computer program code to carry out operations shown in the method 50 may be written in any combination of one or more programming languages, including an object oriented programming language such as C++ or the like and conventional procedural programming languages, such as the "C" programming language or similar programming languages. Moreover, the method 50 may be implemented using any of the herein mentioned circuit technologies.

At illustrated processing block 52, the performance balancer collects performance samples from each node. Performance may be defined according to a number of metrics across all or a subset of cores within a given node. For example, the metric may be phase runtime, a rate at which instructions are retired, a measure of the rate at which floating point operations per second occur, application progress, speed of thread progress, speed of task progress, processor frequency, or other metric that may be utilized to determine a characteristic (including a difference characteristic) that may be desirable to minimize or otherwise modify among nodes. The metric may be based on all of the cores in a given node, some subset of the cores in a given node, or a single core within a given node, such as the performance of the minimum performing thread or the fastest performing thread.

Metrics may be determined with respect to time intervals in a number of ways. For example, time intervals may be shorter than a time to complete a phase. The metric may be even-based, and may be measured at events such as the beginning of a phase or iteration, or metrics may be based on time intervals that are longer than a phase.

Block 54 determines whether a predetermined number of performance samples has been accumulated from each node. If not, control loops back to illustrated processing block 52 for further collection of samples. The number of performance samples to be collected is configurable and may be based on an amount of noise present in the samples. Once the block 54 determines that the performance balancer has accumulated enough performance samples from the nodes, at illustrated processing block 55, a median or other filter may be used as a basis for filtering out noise in the performance samples. Noise in the performance of a phase may occur if the compute, memory, or communication activity is different from one execution of the phase to the next. Noise may be mitigated in a number of ways, such as by using median filtering.

Other filtering techniques may be employed at the processing block 55. For example, filtering may be based on comparisons based on other statistical measures, such as a number of instructions retired, or a number of accesses to memory or Direct Random Access Memory (DRAM), etc., for each execution of a phase to assess if any of the executions are outliers (e.g., as when a sample is two standard deviations away from the mean). The outliers may then be discarded and the mean of the remaining performance samples may be used. Noise filtering based on activity characteristics instead of on a raw signal may be more reliable, since calculating the optimal power balance relies directly on the activity, but only indirectly on runtime. In an embodiment, the filter may be provided following the processing block 56.

The processing block 56 computes a statistic based on the samples. A variety of statistics may be computed here, such as mean, mode, standard deviation etc. In the instant embodiment, the statistic computed at processing block 56 may be a skew of the performance samples. Skew may refer to a variance of all the performance samples divided by their mean. Block 58 determines if the skew is within a predetermined value epsilon. If the skew is less than epsilon, the power among the nodes may be regarded as in balance, and control loops back to the processing block 52.

In the event that the skew is greater than a predetermined epsilon value, the performance balancer may proceed to mitigate the skew. At illustrated processing block 60, the performance balancer uses all of the performance samples collected from all of the nodes in the current iteration, calculating a "master median" form them. Processing block 60 also calculates a "local median" based on the performances samples of a given node from a given iteration. At illustrated processing block 62, the local median for each node may be sorted about the master median and placed in a list, with the best performing nodes at the top of the list, and the worst performing nodes at the bottom of the list.

At illustrated processing block 64, the performance balancer creates pairs of nodes from the sorted list. In one embodiment (e.g., in which node performance is taken to be node speed), this may entail selecting the fastest node and the slowest node to form one pair. Moreover, multiple pairs may be made by progressively matching the fastest and slowest remaining nodes from the list with one another. Such matching is repeated until all nodes (or one less than all the nodes) have been paired.

The approach may work best when the distribution of node performance about their mean is random, but other methods may be used depending on the distribution of node performances above and below the mean. If there are many nodes around or above the mean and a single or few laggards, one may take power from many of the faster nodes at once and distribute the power amongst the slow nodes. In some cases, there may be faster convergence to a balance in which the skew declines to below epsilon.

Once the pairings have been made, illustrated processing block 66 adjusts node performance. In the illustrated embodiment, the processing block 66 steers power between the nodes. A unit of power may be diverted from a pair's faster node to the pair's slower node. It is also possible to trade more than one unit of power at a time according to a gradient of the distance from the mean. The farther away from the mean (or the larger the skew) the more power may be diverted in a given single iteration. This technique may be used to reduce the time to convergence to a stable set of values. Previously discussed processes may be used to adjust the power supplied to the nodes. For example, a power budget may be set for each node that is enforced by processors on each of the nodes. Moreover, a frequency may be selected for the nodes that results in approximately the desired power usage. To this end, the relationship between frequency and power may be determined through modeling or experimentally determined while an application is running.

The method 50 may be carried out on a per-phase basis or on a per iteration basis. For the method 50 to converge to a stable set of values, the phase may exhibit steady-state behavior that repeats in time as the phase reoccurs. On the other hand, in embodiments in which iterations are used as a measure of performance, convergence may occur when the iterations exhibit the same steady-state behavior that repeats in time for each iteration. For a given node power budget, convergence occurs when the application activity profile (balance of compute, communication, and memory activity) is steady-state.

Additionally, FIG. 5 shows an embodiment indicated by the additional processing blocks in the flow chart drawn with broken lines. In the embodiment, block 58 determines whether the skew is within bounds, and if so, control loops back to the processing block 52 where additional performance samples are collected. If the block 58 determines that the skew is not within bounds, then instead of proceeding to the processing block 60, control passes to illustrated processing block 68, where a newly calculated skew is compared to the skew computed from the previous power steering decision. If it is determined at block 70 that the newly calculated skew is greater by some delta than the previous skew (i.e., that the skew is growing by at least some predetermined amount) an incorrect power steering decision may have been made on the previous iteration, and/or unexpected behavior may have resulted from the previous power adjustment.

There are a number of ways in which incorrect power adjustments may arise, such as when using the gradient method of trading power units. In that strategy, the number of power units traded from fast nodes to slow nodes varies with the distance of the metric considered from the mean. If too many units are traded in one direction, the skew may actually increase if the slower node becomes considerably faster than the faster node after power steering. In one embodiment, such a case may be addressed at illustrated processing block 72 by adjusting the power settings back to the state that produced the previous skew considered in the processing block 68, and then directing the system to only trade a single unit of power at a time in its next iteration commencing at the processing block 52.

The method 50 may be said to be "experimental," in that power is apportioned amongst the nodes through a process that uses performance samples generated by the nodes reflective of their actual response to previous balancing commands.

While the method 50 is presented in terms of steering power among nodes based on the computed skew of their performance data with respect to threads and cores for illustration purposes, the method 50 may be practiced on other levels as well. For example, the method 50 may be used to steer power among cabinets by examining the node performance in the cabinets to determine a performance metric for each cabinet, and them comparing that metric to some epsilon-like standard to determine whether cabinet performance modification is warranted and if so, proceeding along the method 50 shown in FIG. 5.

The embodiments presented in FIGS. 4 and 5 may be used on a multilevel hierarchy of computational resources of various kinds, with performance balancing taking place at multiple levels of the hierarchy using a distributed set of performance balancers.

Figure 6:
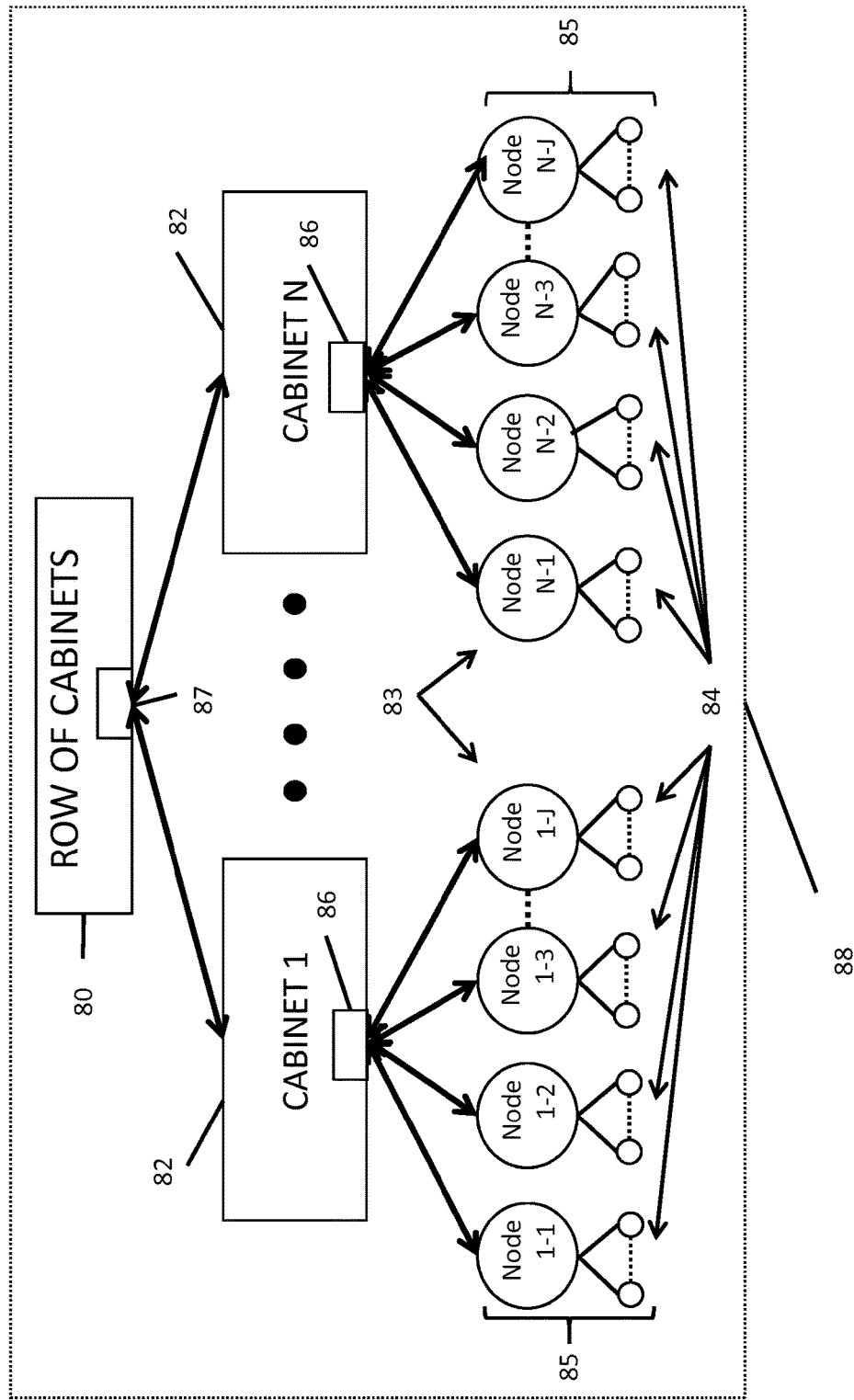
FIG. 6 is a depiction of a hierarchy of computational resources and performance balancers according to an embodiment.

FIG. 6 shows an example of a four-level hierarchy of computational resources, in which a top level is a row of cabinets 80, beneath which are cabinets 82 1 . . . N, each of which cabinets 82 includes nodes 83 1-1 . . . 1-J, N-1 . . . N-J. Each node 83 1-1 . . . 1-J, N-1 . . . N-J, in turn, includes some number of cores 84 (e.g., 8 cores), wherein the cores 84 form a bottom level of the hierarchy. The hierarchy may be regarded as a tree having four levels, in which the leaves are the cores 84 and the root is the row of cabinets 80. Associated with each pair of levels may be a performance balancer including performance balancers herein. Thus, each node 83 may include a performance balancer 85 to balance its constituent cores 84, each cabinet 82 may have a performance balancer 86 to balance its constituent nodes 83, and the row of cabinets may have a performance balancer 87 to balance its constituent cabinets 82. The performance balancers 85, 86, and 87 may be implemented in software, in hardware, or in a combination of software and hardware elements, and may form a hierarchy, such as a tree.

Each of the performance balancers 85, 86, 87 may provide for the bidirectional flow of information: commands from the performance balancer 85, 86, 87 to the computational assets (cores, nodes, cabinets) immediately beneath it, and telemetry (e.g., power usage, metrics of thread execution, etc.) from the computational assets below that is provided back up in return. An overlay network, such as a Tree-Based Overlay Network (TBON) 88 may be implemented to provide a scalable solution for collecting data from each of the levels of the hierarchy and for disseminating global control commands across the hierarchy (e.g., nodes and cabinets).

Implementation of the hierarchical arrangement may be through multiple instances of the embodiments discussed above in conjunction with FIGS. 2 to 5. In addition, any of the modes of balancing a resource (e.g., frequency selection, power steering, etc.), discussed above, may be used in a given level where the hardware used allows. Considering matters from the leaves, e.g., cores 84, and up, performance balancers 85 may use data provided by the individual performance meters concerning the performance of the threads running on the cores to balance the performance of the cores 84 within a given node 83 so as to minimize waiting times in processing threads.

In some implementations, balancing may entail directly adjusting the performance of individual cores through frequency control, or by steering power among the cores. According to one embodiment, the worst performing thread (e.g., a metric that subsumes the performance characteristics of the core on which the thread runs) may define the performance of the node to which it belongs. Thus, telemetry on performance may flow up to the performance balancer 85, and control commands may flow down from the performance balancer 85 to the individual cores within the node or to their related circuitry.

The embodiments in FIGS. 4 and 5 may be used in conjunction with the performance balancer 86 in each of the cabinets 82 to balance the performance among its constituent nodes 83 (the next level in the tree). As discussed above, performance balancing among nodes may entail steering power from relatively faster nodes to relatively slower nodes, or issuing global commands to directly modify the processor frequencies of all of the cores in a given node. Again, information flows bi-directionally: as performance telemetry from the individual nodes via their performance balancers 85 up to their assigned performance balancer 86, and as performance balancing commands from the performance balancer 86 down to the performance balancers 85 and thence to their nodes 83 in a given cabinet.

Cabinets 82 may be grouped together to form a row of cabinets 80. In one embodiment, the performance of a given cabinet may be taken to be the performance of its worst performing node. The embodiments in FIGS. 4 and 5 may be used in conjunction with the performance balancer 87 in row of cabinets 80 to balance the performance among its constituent cabinets 82. As discussed above, performance balancing among cabinets may entail steering power from relatively faster cabinets to relatively slower cabinets. Again, information flows bi-directionally: as performance telemetry from the individual cabinets 82 via their performance balancers 86 up to their assigned row-level performance balancer 87, and as performance balancing commands from the performance balancer 87 down to the performance balancers 86 for the cabinets.

The general approach discussed may be further extended upwards to the level of clusters, and from clusters still higher to balancing grids, and so on.

At each level of the hierarchy, balancing commands may occur at pre-defined time intervals, with the interval duration coarsening as levels move up the tree away from the level or levels beneath it. For example, power balancing may be more frequently done among nodes within a given cabinet than among the cabinets, and power balancing may be more frequently done among cabinets than among rows of cabinets.

In embodiments, power balancing may be from the top level down. For example, a power balancer at the level of the row of cabinets 80 might dictate power budgets to its cabinets 82, which then may respond by dictating power budgets to their constituent nodes, which may then be propagated down to the core level. Each level receives its budget, and responds by balancing the computational resources at its level, as shown in the method 50 (FIG. 5), discussed above. Thus, in some embodiments, power budgets flow down, and telemetry flows up.

The parent level may be quiescent and not issue balancing commands until the child level has provided the performance data. Generally, it may be desired that the child level show stability before its parent level performance balancer issues commands to vary the performance of the children.

In some embodiments, performance balancing may be on a timescale that may be self-configuring throughout a distributed tree hierarchy of performance balancers. The levels of the tree (e.g., the individual hierarchical levels) may operate as fast as the system permits. In a self-configuring embodiment, the timing is event-based instead of time-based. Within each node, the performance balancer may step (e.g., issue a balancing command) when it obtains a performance power-usage measurement (assuming the technique employed entails steering units of power) from the hardware (e.g., cores, nodes, etc.) that it is exerting control over. Node performance data is sent to the parent of the nodes as soon as there have been enough steps for convergence on an optimal allocation of power among the cores. Thus, a relevant "event" may be the availability of a power measurement or other telemetry from the hardware.

At the node granularity, the power balancers tasked with balancing the nodes such as, e.g., performance balancers 86 (FIG. 6), discussed above, receive node performance data and may issue node power usage data steps (e.g., issues balancing commands) as soon as the data from the nodes is available. At the cabinet level, once the nodes have run enough steps to converge on the best allocation of power among nodes in the cabinet and have sent their performance data to the performance balancers 86, the cabinet performance balancers 86 send performance data to the row, which may have its own performance balancer 87. Here the relevant event is the availability of node performance and node power from the node children. And so on at higher levels, if there are any.

Moreover, a time-based timing embodiment may choose a conservative time interval for stepping such that availability of performance and/or power measurements may be assumed. Due to variation or unpredictability, the time interval may be substantially longer than theoretically necessary for the children to experimentally arrive at an optimal distribution of power (or other allocatable asset). In the embodiment, there may be a producer-consumer synchronization between power balancers in the tree. The parent knows its child is ready by waiting for its child to handshake and send it performance results (which may include power results).

Generally, parents supply a power budget to children, and the budget may vary. The children generally may need enough time for an experimental determination of an optimal way to apportion power amongst the children, as through the method 50 (FIG. 5), discussed above. If the parent changes the budget before their children's' experiments are complete, optimal budgets may not have been selected at every level of the hierarchy and in general, they would not be. To avoid the problem of excessively frequent performance commands, the parent may halt and may not advance to a new calculation of skew, e.g., at the processing block 56 (FIG. 5), discussed above, until it has received telemetric input from its children indicating that they have attained a stable balance in the use of their previously supplied budget. Thus, in the embodiment, children may limit or determine how quickly the steps of the method 50 in FIG. 5 execute in the parent, and they may do so via a producer-consumer synchronization, discussed above.

Generally, the child (e.g., a node) may only send performance samples up to its parent (e.g., the cabinet to which the node belongs) after the child has already converged on an optimized favorable power allocation. Hence, the parent does not send a new power budget to the child before the child is ready to receive it. This self-configuration strategy has the advantage of maximizing responsiveness of global load balancing, and may be particularly useful when stepping the performance balancer based on phase execution instead of time intervals.

In dealing with multilevel, hierarchical, tree-like arrangements of computational resources, performance at each level of the tree may be determined by aggregating performance for the subtree below it. Many different aggregation functions may be used. For example, performance may be defined in terms of the minimum performance of any sub-tree, the average performance of all sub-trees, or by other aggregations. A variety of metrics of performance may be utilized. The metric employed may be phase runtime, application progress, processor frequency, or any other metric one wishes to equalize across the nodes in the job. For example, node progress may be taken to be the minimum of the progress of the threads running on the cores in the node. An aggregation computation may be performed by the performance balancer or through the assistance of an overlay network, such as TBON 88 (FIG. 6), discussed above.

In some embodiments, computational resources may be hardware, in other embodiments they may be software, and in still other embodiments they may be a mix of hardware and software. While some of the foregoing embodiments disclosed herein have been presented in terms of steering power among computational resources to control for performance variation among them, other methods of correcting performance variation among computational resources may be used, and these may entail varying other operating parameters apart from or in addition to power (which itself may be regarded as an operating parameter). For example, in other embodiments of performance variation correction may entail making decisions regarding software parameters such as the choice of algorithm used, the amount of parallelism to employ, controlling processor frequency, controlling core frequency, etc.

Figure 7:
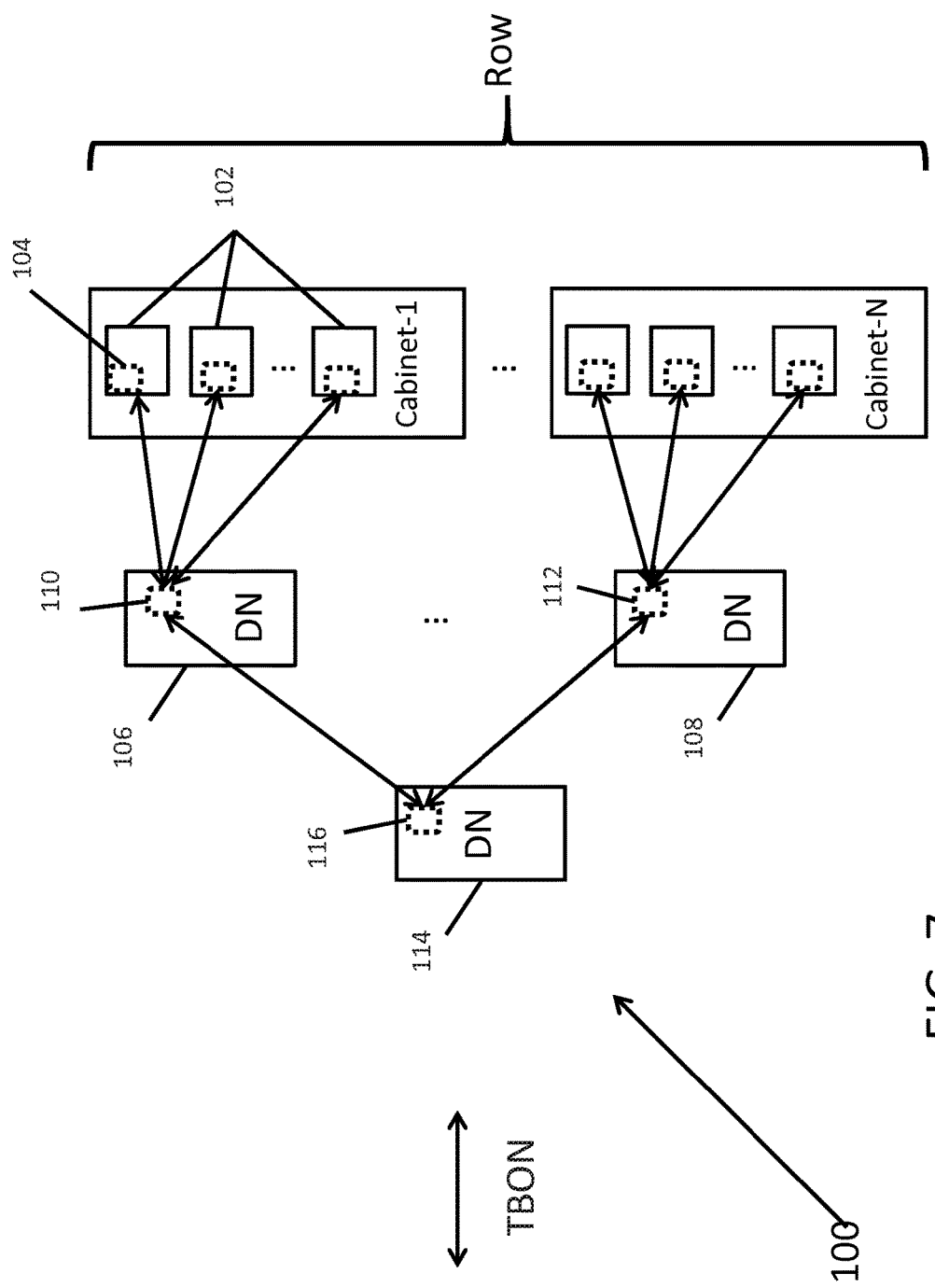
FIG. 7 is a schematic of an example of a hierarchical tree including dynamic, hierarchically arranged power balancers according to an embodiment.

FIG. 7 shows a more system of performance balancing according to an embodiment. Computational resources within a row of cabinets (e.g., cores, nodes, cabinets) are to be balanced for better performance, for examples as part of an HPC system. In one example, there are cabinets 1 . . . N in a row. Each of the cabinets 1 . . . N, such as the cabinet 1, may contain a number of nodes 102, and each node 102 may contain a number of cores (or processors). Within each node 102, there may be a performance balancer 104, which may be implemented as software, hardware, or a combination of software and hardware. Performance balancers 104 may gather telemetry from individual cores and/or may issue commands to cores that vary their performance.

A dedicated node (DN) 106 including a performance balancer 110 may be associated with each of the cabinets 1 . . . N. Each of the dedicated nodes 106 may be tasked with providing resources to help implement performance balancing of nodes within a given cabinet beneath it. Thus, in the illustrated example, the dedicated node 106 and its performance balancer 110 are tasked with providing performance balancing for the nodes 102 within the cabinet 1, and the dedicated node 108 and its performance balancer 112 are tasked with providing performance balancing for the nodes within the cabinet N. Performance balancers 110,112 receive telemetry from, and issue performance commands to, the performance balancers 104 of the nodes in their respective cabinets.

At the next level up, power balancing of the cabinets 1 . . . N uses a dedicated node 114 and its performance balancer 116, which may receive telemetry from the dedicated nodes 106, 108 regarding their cabinets, and issue commands to the dedicated nodes 106, 108 to modify the performance of their cabinets.

A TBON (indicated in FIG. 7 by double-arrowed lines) may be employed to aggregate command/performance telemetry and dissemination of control. The TBON may be implement in-band over network fabric, or out of band over Ethernet.

Dedicated nodes may be physically separate from cabinets, as shown in FIG. 7, or dedicated nodes may be physically part of cabinets that they help control. In addition to helping to balance the computational assets at a level beneath a dedicated node, the dedicated node may run other jobs as well, so long as the jobs are unrelated to those for which performance balancing is sought.

FIG. 7 may be viewed as showing two trees: a tree of computational assets (cores, nodes, N-cabinets, and a single row of cabinets) of depth four, and a tree of power balancers 104, 110, 116 of depth three.

There may be a general overarching system policy present. In this context, the term "system policy" may refer to the "knobs" in hardware or software that may be adjusted to affect performance and/or power usage. For example, in the context of hardware, the knobs may provide control over power budgets for hardware components like cabinets and nodes, as well as direct control over core frequency and/or processor frequency within nodes. In a software context, knobs may adjust software parameters such as choice of algorithm, the degree of parallelism employed, etc. Additionally, the "knob" to turn may vary depending on the level considered. For example, at the cabinet level electrical power may be adjusted to control speed, whereas at the node level, software parameters may be adjusted to vary a different system parameter, or cores frequencies may be controlled directly.

In the embodiment shown in FIG. 7, a system policy may itself be decomposed hierarchically among nodes, cabinets, etc. Hierarchical decomposition in this context may signify that the embodiment defines a power budget at multiple granularities, with the children's budgets summing up to the parent's budget or to a parent's budget minus some overhead budget in the parent.

Thus, embodiments depicted herein may offer dynamic hierarchical performance balancing across a hierarchy of levels of computational assets via a hierarchy of performance balancers. Telemetry may flow from level-to-level, and parent levels may issue commands to their children that affect performance. A net result may be the more efficient use of the computational resources at hand across a hierarchical grouping.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface may be configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what may be described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

Additional Notes and Examples

Example 1 may include a method of controlling performance among computational resources, comprising collecting a plurality of performance samples from each of a plurality of computational resources, computing a statistic from the plurality of performance samples for each computing resource of the plurality of computational resources, and adjusting an operating parameter of at least one computational resource of the plurality of computational resources, wherein adjusting the operating parameter causes the performance of the at least one computational resource to change.

Example 2 may include the method of Example 1, wherein the operating parameter includes an operating frequency of at least one core and/or at least one processor.

Example 3 may include the method of any one of Examples 1 to 2, wherein the operating parameter includes an amount of power supplied to at least one computational resource of the plurality of computational resources, and wherein the method further includes steering power from at least one relatively faster computational resource of the plurality of computational resources to at least one relatively slower computational resource of the plurality of computational resources.

Example 4 may include the method of any one of Examples 1 to 3, wherein steering is based on the statistic, and wherein the statistic is a measure of a skew derived from the plurality of performance samples.

Example 5 may include the method of any one of Examples 1 to 4, wherein the plurality of computational resources includes one or more of a core, a processor, a node, a cabinet, a row, a cluster, or a grid.

Example 6 may include the method of any one of Examples 1 to 5, further including arranging the plurality of computational resources in a list from fastest to slowest, successively pairing a relatively faster computational resource of the plurality of computational resources on the list with a relatively slower computational resource of the plurality of computational resources on the list to form pairs, and steering electrical power from the relatively faster computational resource within each of the pairs to the relatively slower computational resource within each of the pairs.

Example 7 may include the method of any one of Examples 1 to 6, wherein performance variations within a group of computational resources of the plurality of computational resources are reduced.

Example 8 may include the method of any one of Examples 1 to 7, wherein the plurality of computational resources are arrayed in a hierarchy including a plurality of levels, wherein a plurality of performance balancers mediate between the plurality of levels, and wherein at least one performance balancer of the plurality of performance balancers issues performance commands to computational resources arrayed in the hierarchy at a first level of the plurality of levels and receives performance data back from the computational resources arrayed in the hierarchy at a second level of the plurality of levels.

Example 9 may include the method of any one of Examples 1 to 8, wherein the plurality of performance balancers form a hierarchy of performance balancers, wherein relatively upper level performance balancers issue performance commands to relatively lower level performance balancers beneath the relatively upper level performance balancers in the hierarchy of performance balancers, wherein relatively lower level performance balancers send data to relatively upper level performance balancers above the relatively lower performance balancers in the hierarchy, and wherein the data is performance data of a level of the hierarchy of computational resources.

Example 10 may include the method of any one of Examples 1 to 9, wherein the commands include one or more of frequency settings or power budgets.

Example 11 may include the method of any one of Examples 1 to 10, wherein the data is sent up the hierarchy of performance balancers from a given level of the hierarchy of computational resources only when the given level has a stable performance configuration.

Example 12 may include the method of any one of Examples 1 to 11, wherein the commands are sent down from a performance balancer only after the data has been sent to the performance balancer.

Example 13 may include the method of any one of Examples 1 to 12, wherein the performance samples are collected at times that vary with the level of the hierarchy of computational resources from which the performance samples are collected.

Example 14 may include an apparatus to vary performance among computational resources, comprising a plurality of computational resources that are to be connected to one another, logic, implemented at least partly in fixed-functionality hardware, to collect a plurality of performance samples from each computational resource of the plurality of computational resources, compute a statistic from the plurality of performance samples for each computational resource of the plurality of computational resources, and adjust an operating parameter of at least one computational resource of the plurality of computational resources based on the statistic.

Example 15 may include the apparatus of Example 14, wherein the operating parameter is to include one or more of power or frequency.

Example 16 may include the apparatus of any one of Examples 14 to 15, wherein the plurality of computational resources is to include one or more of a core, a processor, a node, a cabinet, a row, a cluster, or a grid.

Example 17 may include the apparatus of any one of Examples 14 to 16, wherein the computational resources are to be arrayed in a hierarchy including a plurality of levels, wherein a plurality of performance balancers are to mediate between the plurality of levels, wherein at least one performance balancer of the plurality of performance balancers is to issue performance commands to computational resources to be arrayed in the hierarchy at a first level of the plurality of levels and is to receive performance data back from the computational resources to be arrayed in the hierarchy at a second level of the plurality of levels.

Example 18 may include the apparatus of any one of Examples 14 to 17, wherein the plurality of performance balancers form a hierarchy of performance balancers, wherein relatively upper level performance balancers are to issue performance commands to relatively lower level performance balancers beneath the relatively upper level performance balancers in the hierarchy of performance balancers, wherein relatively lower level performance balancers are to send data to relatively upper level performance balancers above the relatively lower performance balancers in the hierarchy, and wherein the data is to be performance data of a level of the hierarchy of computational resources.

Example 19 may include the apparatus of any one of Examples 14 to 18, wherein the performance commands are to include one or more of frequency settings or power budgets.

Example 20 may include the apparatus of any one of Examples 14 to 19, wherein the logic is to arrange the plurality of computational resources in a list from fastest to slowest, successively pair off a relatively faster computational resource of the plurality of computing resources on the list with a relatively slower computational resource of the plurality of computing resources on the list to form pairs, and steer electrical power from the relatively faster computational resource within each of the pairs to the relatively slower computational resource within each of the pairs.

Example 21 may include least one computer readable storage medium, wherein the instructions, when executed, cause a computing device to collect a plurality of performance samples from each of a plurality of connected computational resources, compute a statistic from the plurality of performance samples for each computational resource of the plurality of computational resources, and adjust an operating parameter of at least one computational resource of the plurality of computational resources based on the statistic.

Example 22 may include the at least one computer readable storage medium of Example 21, at least one computer readable storage medium of claim 21, wherein the operating parameter is include one or more of power or frequency.

Example 23 may include the at least one computer readable storage medium of any of Examples 21 to 22, wherein the plurality of computational resources is to include one or more of a core, a processor, a node, a cabinet, a row, a cluster, or a grid.

Example 24 may include the at least one computer readable storage medium of any one of Examples 21 to 23, wherein the computational resources are to be arrayed in a hierarchy including a plurality of levels, and wherein the instructions, when executed, cause the computing device to mediate between the plurality of levels of the hierarchy, issue performance commands to computational resources to be arrayed in the hierarchy at a first level of the plurality of levels, and receive performance data back from the computational resources arrayed in the hierarchy at a second level of the plurality of levels.

Example 25 may include the at least one computer readable storage medium of any one of Examples 21 to 24, wherein the instructions, when executed, cause a computing device to form a hierarchy of performance balancers from a plurality of performance balancers, direct relatively upper level performance balancers to issue performance commands to relatively lower level performance balancers beneath the relatively upper level performance balancers in the hierarchy of performance balancers; and direct the relatively lower level performance balancers to send data to the relatively upper level performance balancers above the relatively lower performance balancers in the hierarchy.

Example 26 may include the at least one computer readable storage medium of any one of Examples 21 to 25, wherein the performance commands are to include one or more of frequency settings or power budgets.

Example 27 may include the at least one computer readable storage medium of any one of Examples 21 to 26, wherein the instructions, when executed, cause a computing device to arrange the plurality of computational resources in a list from fastest to slowest, successively pair off a relatively faster computational resource of the plurality of computing resources on the list with a relatively slower computational resource of the plurality of computing resources on the list to form pairs of a relatively faster computational resource and a relatively slower computational resource, and steer electrical power from the relatively faster computational resource within each of the pairs to the relatively slower computational resource within each of the pairs.

Example 28 may include an apparatus for controlling performance variation among computational resources, comprising means for collecting a plurality of performance samples from each of a plurality of computational resources, means for computing a statistic from the plurality of performance samples for each computing resource of the plurality computational resources, and means for adjusting an operating parameter of at least one computational resource of the plurality of computational resources, wherein the means for adjusting the operating parameter causes the performance of the at least one computational resource to change.

Example 29 may include the apparatus of Example 28, wherein the operating parameter includes an operating frequency of at least one core and/or at least one processor.

Example 30 may include the apparatus of any one of Examples 28 to 29, wherein the operating parameter includes an amount of power supplied to at least one computational resource of the plurality of computational resources, further including means for steering power from at least one relatively faster computational resource of the plurality of computation resources to at least one relatively slower computational resource of the plurality of computation resources.

Example 31 may include the apparatus of any one of Examples 28 to 30, wherein steering is based on the statistic, and wherein the statistic is a measure of a skew derived from the performance samples.

Example 32 may include the apparatus of any one of Examples 28 to 31, wherein the plurality of computational resources include one or more of a core, a processor, a node, a cabinet, a cluster, or a grid.

Example 33 may include the apparatus of any one of Examples 28 to 32, further including means for arranging the plurality of computational resources in a list from fastest to slowest, means for successively pairing a relatively faster computational resource of the plurality of computation resources on the list with a relatively slower computational resource of the plurality of computation resources on the list to form pairs, and means for steering electrical power from the relatively faster computational resource within each of the pairs to the relatively slower computational resource within each of the pairs.

Example 34 may include the apparatus of any one of Examples 28 to 33, wherein performance variations within a group of computational resources are to be reduced.

Example 35 may include the apparatus of any one of Examples 28 to 34, wherein the plurality of computational resources are arrayed in a hierarchy having a plurality of levels, wherein a plurality of performance balancers mediate between the levels of the hierarchy, and wherein at least one performance balancer of the plurality of performance balancers issues performance commands to computational resources arrayed in the hierarchy at a first level of the plurality of levels and receives performance data back from the computational resources arrayed in the hierarchy at a second level of the plurality of levels.

Example 36 may include the apparatus of any one of Examples 28 to 35, wherein the plurality of performance balancers form a hierarchy of performance balancers, wherein relatively upper level performance balancers issue performance commands to relatively lower level performance balancers beneath the relatively upper level performance balancers in the hierarchy of performance balancers, wherein relatively lower level performance balancers send data to relatively upper level performance balancers above the relatively lower performance balancers in the hierarchy, and wherein the data is performance data of a level of the hierarchy of computational resources.

Example 37 may include the apparatus of any one of Examples 28 to 36, wherein the commands include one or more of frequency settings or power budgets.

Example 38 may include the apparatus of any one of Examples 28 to 37, wherein data is sent up the hierarchy of performance balancers from a given level of the hierarchy of computational resources only when the given level has a stable performance configuration.

Example 39 may include the apparatus of any one of Examples 28 to 38, wherein the commands are to be sent down from a performance balancer only after the data has been sent to the performance balancer.

Example 40 may include the apparatus of any one of Examples 28 to 39, wherein the performance samples are collected at times that vary with the level of the hierarchy of computational resources from which the performance samples are collected.

Example 41 may include the apparatus of any one of Examples 28 to 40, wherein the operating parameter includes one or more of a choice of algorithm or a degree of parallelism among computational resources.

Example 42 may include the apparatus of any one of Examples 28 to 41, wherein at least one of the plurality of performance balancers is located on a dedicated node.

Example 43 may include a method of controlling performance among a hierarchical arrangement of computational resources, comprising collecting a plurality of performance samples from each of a plurality of computational resources, computing a statistic from the plurality of performance samples for each computing resource of the plurality of computational resources, and adjusting an operating parameter of at least one computational resource of the plurality of computational resources, wherein adjusting the operating parameter causes the performance of the at least one computational resource to change.

Example 44 may include the method of Example 43, wherein the operating parameter includes an operating frequency of at least one core and/or at least one processor.

Example 45 may include the method of any one of Examples 43 to 44, wherein the plurality of computational resources are arrayed in a hierarchy including a plurality of levels, wherein a plurality of performance balancers mediate between the plurality of levels, and wherein at least one performance balancer of the plurality of performance balancers issues performance commands to computational resources arrayed in the hierarchy at a first level of the plurality of levels and receives performance data back from the computational resources arrayed in the hierarchy at a second level of the plurality of levels.

Example 46 may include the method of any one of Examples 43 to 45, wherein the plurality of performance samples are collected at dynamically variable time intervals.

Example 47 may include the method of any one of Examples 43 to 46, wherein the plurality of performance samples are collected based on a phase of software executing on at least one computational resource of the plurality of computational resources.

Example 48 may include the method of any one of Examples 43 to 47, wherein the plurality of performance samples are collected on self-configuring timescales.

Example 49 may include the method of any one of Examples 43 to 48, wherein the plurality of performance samples are collected at times that vary with a level of a hierarchy from which the samples are collected.

Example 50 may include the method of any one of Examples 43 to 49, further including arranging the plurality of computational resources in a list from fastest to slowest, successively pairing a number m of relatively slower computational resources of the plurality of computation resources with a number k of relatively faster computational resources of the plurality of computation resources, and steering power from all of the k relatively faster computational resources of the plurality of computation resources to the m relatively slower computational resources of the plurality of computation resources, wherein n is a number of computational resources of the plurality of computation resources, m is to vary from 1 to n−1, and m+k is to equal n.

Techniques and structures described herein may therefore reduce power consumption in graphics processors, and are applicable to other types of processors as well. As a result, graphics processors and other types of processors in which these techniques and structures are used may provide relatively higher energy efficiency.

Various embodiments and various modules may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment may be implemented using hardware elements and/or software elements may vary in accordance with any number of factors, such as desired computational rate, power levels, heat tolerances, processing cycle budget, input data rates, output data rates, memory resources, data bus speeds and other design or performance constraints.

While both hardware and software implementations of embodiments are presented herein, a hardware implementation may be utilized to provide power savings by using a reduced number of instructions.

Example sizes/models/values/ranges may have been given, although embodiments are not limited to the same. As manufacturing techniques mature over time, it may be expected that devices of smaller size and smaller tactile element size could be manufactured. In addition, well known electrical or fluidic components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment may be to be implemented, i.e., such specifics should be well within purview of one skilled in the art. Where specific details (e.g., circuits) are set forth in order to describe example embodiments, it should be apparent to one skilled in the art that embodiments may be practiced without, or with variation of, these specific details. The description may be thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it may be understood that the indefinite articles "a" or "an" carries the meaning of "one or more" or "at least one".

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus to vary computational performance among computational resources, comprising:
   a plurality of computational resources that are arrayed in a hierarchy having a plurality of levels including a core level, wherein the core level comprises a plurality of cores; and
   logic, implemented at least partly in fixed-functionality hardware, to:
      collect a plurality of performance samples from each computational resource of the plurality of computational resources;
      compute a statistic from the plurality of performance samples for each computational resource of the plurality of computational resources;
      vary a computational performance level of at least one computational resource of the plurality of computational resources by adjusting an operating parameter of the at least one computational resource based on the statistic, wherein the statistic is derived from the plurality of performance samples;
      arrange the plurality of computational resources in a list from fastest to slowest;
      successively pair off a relatively faster computational resource of the plurality of computing resources on the list with a relatively slower computational resource of the plurality of computing resources on the list to form a plurality of pairs; and
      steer electrical power from the relatively faster computational resource within each of the pairs to the relatively slower computational resource within each of the pairs.

2. The apparatus of claim 1, wherein the operating parameter is to include one or more of power or frequency.

3. The apparatus of claim 1, wherein the plurality of levels includes one or more of a processor level, a node level, a cabinet level, a row level, a cluster level, or a grid level.

4. The apparatus of claim 3, wherein a plurality of performance balancers are to mediate between the plurality of levels, wherein at least one performance balancer of the plurality of performance balancers is to issue performance commands to computational resources to be arrayed in the hierarchy at a first level of the plurality of levels and is to receive performance data back from the computational resources to be arrayed in the hierarchy at a second level of the plurality of levels.

5. The apparatus of claim 4, wherein the plurality of performance balancers form a hierarchy of performance balancers, wherein relatively upper level performance balancers are to issue performance commands to relatively lower level performance balancers beneath the relatively upper level performance balancers in the hierarchy of performance balancers, wherein relatively lower level performance balancers are to send data to relatively upper level performance balancers above the relatively lower performance balancers in the hierarchy, and wherein the data is to be performance data of a level of the hierarchy of computational resources.

6. The apparatus of claim 4, wherein the performance commands are to include one or more of frequency settings or power budgets.

7. At least one non-transitory computer readable storage medium, wherein the instructions, when executed, cause a computing device to:
   collect a plurality of performance samples from each of a plurality of computational resources that are arrayed in a hierarchy having a plurality of levels including a core level, wherein the core level comprises a plurality of cores;
   compute a statistic from the plurality of performance samples for each computational resource of the plurality of computational resources;
   vary a computational performance level of at least one computational resource of the plurality of computational resources by adjusting an operating parameter of the at least one computational resource based on the statistic, wherein the statistic is derived from the plurality of performance samples;
   arrange the plurality of computational resources in a list from fastest to slowest;
   successively pair off a relatively faster computational resource of the plurality of computing resources on the list with a relatively slower computational resource of the plurality of computing resources on the list to form a plurality of pairs; and
   steer electrical power from the relatively faster computational resource within each of the pairs to the relatively slower computational resource within each of the pairs.

8. The at least one non-transitory computer readable storage medium of claim 7, wherein the operating parameter is to include one or more of power or frequency.

9. The at least one non-transitory computer readable storage medium of claim 7, wherein the plurality of levels includes one or more of a processor level, a node level, a cabinet level, a row level, a cluster level, or a grid level.

10. The at least one non-transitory computer readable storage medium of claim 7, wherein the instructions, when executed, cause the computing device to:
   mediate between the plurality of levels of the hierarchy;
   issue performance commands to computational resources to be arrayed in the hierarchy at a first level of the plurality of levels; and
   receive performance data back from the computational resources arrayed in the hierarchy at a second level of the plurality of levels.

11. The at least one non-transitory computer readable storage medium of claim 7, wherein the instructions, when executed, cause a computing device to:
   form a hierarchy of performance balancers from a plurality of performance balancers;
   direct relatively upper level performance balancers to issue performance commands to relatively lower level performance balancers beneath the relatively upper level performance balancers in the hierarchy of performance balancers; and
   direct the relatively lower level performance balancers to send data to the relatively upper level performance balancers above the relatively lower performance balancers in the hierarchy.

12. The at least one non-transitory computer readable storage medium of claim 11, wherein the performance commands are to include one or more of frequency settings or power budgets.

13. An apparatus to vary computational performance among computational resources, comprising:
   a plurality of computational resources comprising a plurality of cores that are arrayed in a hierarchy; and
   logic, implemented at least partly in fixed-functionality hardware, to:
      collect a plurality of performance samples from each computational resource of the plurality of computational resources;
      compute a statistic from the plurality of performance samples for each computational resource of the plurality of computational resources;
      vary a computational performance level of at least one computational resource of the plurality of computational resources by adjusting an operating parameter of the at least one computational resource based on the statistic, wherein the statistic is derived from the plurality of performance samples;
      arrange the plurality of computational resources in a list from fastest to slowest;
      successively pair off a relatively faster computational resource of the plurality of computing resources on the list with a relatively slower computational resource of the plurality of computing resources on the list to form a plurality of pairs; and
      steer electrical power from the relatively faster computational resource within each of the pairs to the relatively slower computational resource within each of the pairs.

14. The apparatus of claim 13, wherein the statistic is a measure of a skew derived from the plurality of performance samples, and wherein the skew is a variance of the plurality of performance samples divided by a mean of the plurality of performance samples.

15. The apparatus of claim 13, wherein the hierarchy includes a plurality of levels, including one or more of a processor level, a node level, a cabinet level, a row level, a cluster level, or a grid level.

16. The apparatus of claim 15, wherein a plurality of performance balancers are to mediate between the plurality of levels, wherein at least one performance balancer of the plurality of performance balancers is to issue performance commands to computational resources to be arrayed in the hierarchy at a first level of the plurality of levels and is to receive performance data back from the computational resources to be arrayed in the hierarchy at a second level of the plurality of levels.

17. The apparatus of claim 16, wherein the plurality of performance balancers form a hierarchy of performance balancers, wherein relatively upper level performance balancers are to issue performance commands to relatively lower level performance balancers beneath the relatively upper level performance balancers in the hierarchy of performance balancers, wherein relatively lower level performance balancers are to send data to relatively upper level performance balancers above the relatively lower performance balancers in the hierarchy, and wherein the data is to be performance data of a level of the hierarchy of computational resources.

18. The apparatus of claim 16, wherein the performance commands are to include one or more of frequency settings or power budgets.

19. The apparatus of claim 13, wherein the operating parameter is to include one or more of power or frequency.

20. At least one non-transitory computer readable storage medium, wherein the instructions, when executed, cause a computing device to:
   collect a plurality of performance samples from each of a plurality of computational resources comprising a plurality of cores that are arrayed in a hierarchy;
   compute a statistic from the plurality of performance samples for each computational resource of the plurality of computational resources;
   vary a computational performance level of at least one computational resource of the plurality of computational resources by adjusting an operating parameter of the at least one computational resource based on the statistic, wherein the statistic is derived from the plurality of performance samples;
   arrange the plurality of computational resources in a list from fastest to slowest;
   successively pair off a relatively faster computational resource of the plurality of computing resources on the list with a relatively slower computational resource of the plurality of computing resources on the list to form a plurality of pairs; and
   steer electrical power from the relatively faster computational resource within each of the pairs to the relatively slower computational resource within each of the pairs.

21. The at least one non-transitory computer readable storage medium of claim 20, wherein the statistic is a measure of a skew derived from the plurality of performance samples, and wherein the skew is a variance of the plurality of performance samples divided by a mean of the plurality of performance samples.

22. The at least one non-transitory computer readable storage medium of claim 20, wherein the hierarchy includes a plurality of levels, including one or more of a processor level, a node level, a cabinet level, a row level, a cluster level, or a grid level.

23. The at least one non-transitory computer readable storage medium of claim 20, wherein the operating parameter is to include one or more of power or frequency.

* * * * *